US006425679B1

United States Patent
Yu (10) Patent No.: US 6,425,679 B1
(45) Date of Patent: Jul. 30, 2002

(54) AUXILIARY SAFETY OR TURNING LIGHT DEVICE FOR VEHICLE

(76) Inventor: Chen Ru Yu, 1F, No. 41, Lane 174, Yu Chern South Road, Yang Mei Town, Tao Yuan Hsien (TW), 326

( * ) Notice: Subject to any disclaimer, the term of this patent is extended or adjusted under 35 U.S.C. 154(b) by 0 days.

(21) Appl. No.: 09/691,135

(22) Filed: Oct. 16, 2000

(51) Int. Cl.[7] ................................................ F21V 21/00
(52) U.S. Cl. ...................... 362/249; 362/487; 362/249; 362/252; 362/145
(58) Field of Search ................................ 362/245, 487, 362/495, 496, 249, 252, 145

(56) References Cited

U.S. PATENT DOCUMENTS

| | | | | |
|---|---|---|---|---|
| 3,894,225 A | * | 7/1975 | Chao ........................... 240/1 R |
| 4,376,966 A | * | 3/1983 | Tieszen ........................ 362/249 |
| 4,965,704 A | * | 10/1990 | Oshorne, Sr. ................. 362/81 |
| 5,404,279 A | * | 4/1995 | Wood ........................... 362/145 |
| 6,183,104 B1 | * | 2/2001 | Ferrara ........................ 362/145 |

* cited by examiner

Primary Examiner—Sandra O'Shea
Assistant Examiner—Jacob Y. Choi
(74) Attorney, Agent, or Firm—Charles E. Baxley (57) ABSTRACT

An auxiliary light device includes one or more plates having a pair of inclined surfaces and a cusp formed on a bulge, and a light device having a pair of bent panels engaged onto the inclined surfaces and the cusp of the plate and having one or more light members for reflecting or for generating a warning light. The plate has two outwardly extended bars, and a cover has two catches engaged with the bars for securing the cover to the plate and for shielding the light device. A light bulb or a light emitting diode or a luminescent material may further be disposed on the plate.

2 Claims, 8 Drawing Sheets

AUXILIARY SAFETY OR TURNING LIGHT DEVICE FOR VEHICLE

BACKGROUND OF THE INVENTION

1. Field of the Invention

The present invention relates to a light device, and more particularly to an auxiliary turning and safety light device for vehicles.

2. Description of the Prior Art

Typical vehicles comprise four light devices provided in the corners for indicating the turning of the vehicle. However, the light devices may not be clearly seen beside the vehicles. The typical vehicles have no light devices provided on the side portions thereof such that the vehicles may not know whether the other vehicles are going to turn or not when the vehicles are side by side.

The present invention has arisen to mitigate and/or obviate the afore-described disadvantages of the conventional light devices for vehicles.

SUMMARY OF THE INVENTION

The primary objective of the present invention is to provide an auxiliary light device for attaching to any suitable places of the vehicles, the cycles, etc., for reflecting lights and/or for generating a warning signal to indicate the turning of the vehicles.

The other objective of the present invention is to provide an auxiliary light device which may be carried by the children or by the pedestrians for reflecting lights and/or for generating a warning signal and for safety purposes.

In accordance with one aspect of the invention, there is provided an auxiliary light device comprising a plate including a pair of inclined surfaces provided thereon, and a cusp defined between the inclined surfaces, and a light device including a pair of panels coupled together at a bent portion for engaging onto the inclined surfaces and the cusp of the plate respectively, the light device including at least one light member provided on the panels for reflecting the lights or for generating a warning light signal. The auxiliary light device particularly benefits the children or the pedestrians who may carry the auxiliary light device that may reflect the lights and/or that may generate a warning signal for safety purposes.

The plate includes a pair of bars extended therefrom and having the panels arranged between the bars. The plate includes a pair of grooves formed therein, the panels each includes a free edge engaged into the grooves respectively for securing the light device onto the plate. The grooves are formed between the inclined surfaces and the bars of the plate respectively. A cover is further provided and includes a pair of catches extended therefrom and engaged with the bars for attaching the cover onto the plate and for shielding and covering the light device.

The plate includes a bulge extended therefrom and having the inclined surfaces and the cusp formed thereon. A second light member may further be provided and attached to the plate. For example, the plate includes one or more sockets provided thereon, and one or more light bulbs or light emitting diodes or the other light members engaged with the sockets.

At least one electric coupler may further be provided and coupled to the light member for coupling the light member to an electric power source. An attaching member or a securing device may further be provided for attaching the plate onto an object.

The plate may be an integral one-piece plate or may be separated into a number of plates according to the sizes or widths or the lengths of the objects to be attached with the auxiliary light device. The reflective light device and the light bulb may be secured on the integral one-piece plate.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Referring to the drawings, and initially to FIGS. 1–8, an auxiliary light device in accordance with the present invention comprises a base or a plate 10 which may be attached or secured to any suitable positions or places of an object, such as a vehicle 80 with a securing device, such as an adhesive material 81, or an adhesive layer or an adhesive tape, etc. The auxiliary light device may also be attached onto the cycles, the carts, the school bags, or may even be carried by the children or by the pedestrians for reflecting lights and/or for generating a warning light signal and for safety purposes.

The plate 10 includes a pair of bars 11 extended inclinedly and outwardly from the front portion or from one of the surfaces thereof and extended along the longitudinal direction of the plate 10, and includes a wedge or a bulge 12 extended outward therefrom and located between the bars 11 and having a cusp 14 defined or formed between a pair of inclined surfaces 16. A pair of grooves 13 are formed between the bulge 12 and the bars 11 respectively.

A light device 30 includes a pair of panels 31 bent relative to each other and coupled together at a bent portion 32 for engaging onto the surfaces 16 and the cusp 14 of the plate 10 respectively, best shown in FIGS. 2–5 and 7. The free edges of the panels 31 are engaged in the grooves 13 of the plate 10 (FIG. 5), such that the light device 30 may be attached to the plate 10 without any further adhesive or securing or fastening devices. The light device 30 includes one or more light members 33 attached onto or disposed in the panels 31. The light members 33 may be any suitable light members, such as the light bulbs, light emitting diodes, strobe lights, and particularly the cold lighting members, the luminescent materials, luminescent plastics, etc. The light members 33, such as the luminescent plastics, may reflective the lights, particularly during the night, for safety purposes. In addition, the light members 33 may also be coupled to the electric source, such as that of the vehicles, with electric couplers or plugs 34 (FIG. 4) for generating lights particularly during the night for generating a warning signal and for safety purposes. A cover 40 is transparent or semi-transparent and includes a pair of catches 41 extended therefrom corresponding to the bars 11 of the plate 10 for engaging with the bars 11 and for attaching and securing the cover 40 onto the plate 10 without any further adhesive or securing or fastening devices. The cover 40 includes an end wall 43 for engaging with the bars 11 and for solidly securing the cover 40 to the bars 11 of the plate 10.

The auxiliary light device further includes one or more plates 20 having a pair of bars 21 similar to the bars 11 of the plate 10. One or more covers 40 also each includes a pair of catches 41 extended therefrom for engaging with the bars 21 and for attaching and securing the covers 40 onto the plate 20 without any further adhesive or securing or fastening devices. The covers 40 each includes an end wall 43 for engaging with the bars 21 and for solidly securing the covers 40 to the bars 21 of the plate 20. The plate 20 includes one or more sockets 22 provided thereon each for receiving a light member, such as a light bulb 50, a light emitting diode or the like.

Figure 9:
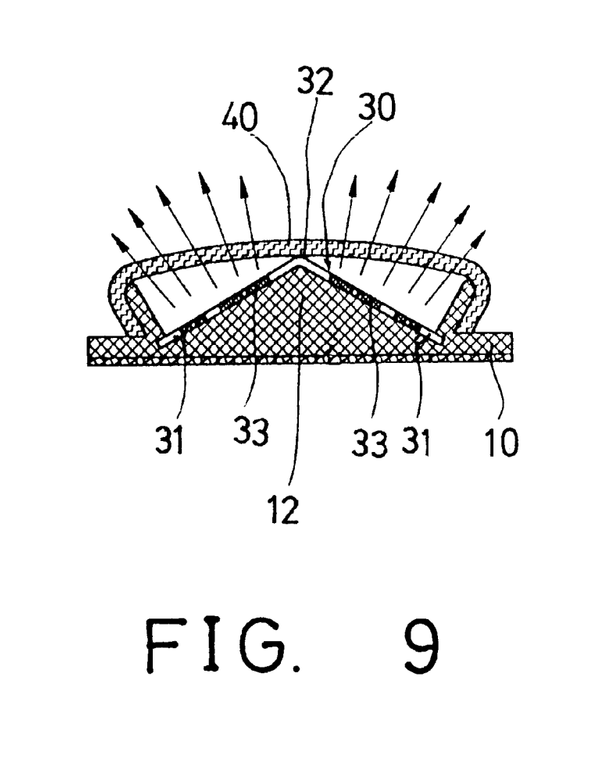
FIGS. 9 and 10 are cross sectional views similar to FIG. 5, illustrating the operation of the auxiliary light device.
Figure 10:
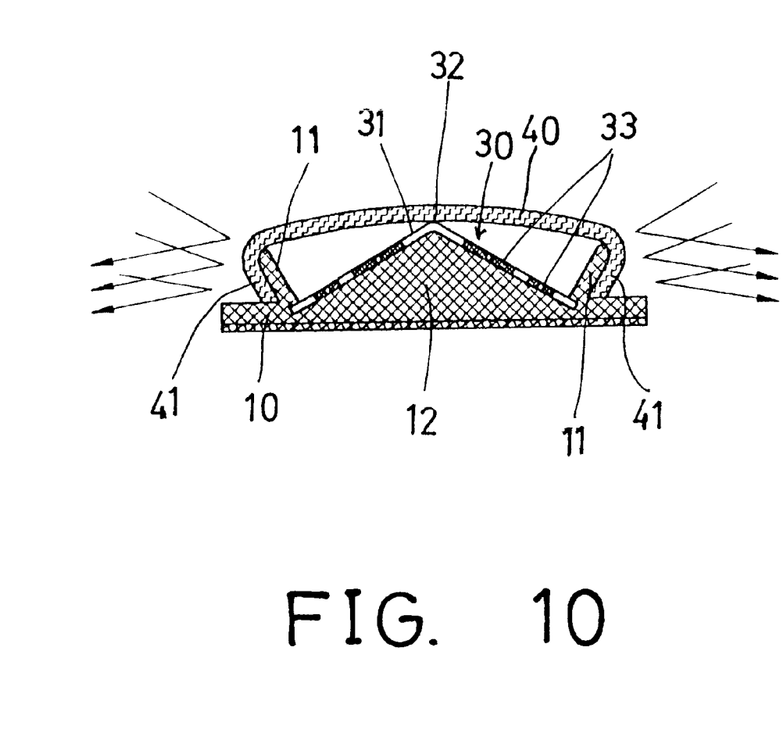
Figure 11:
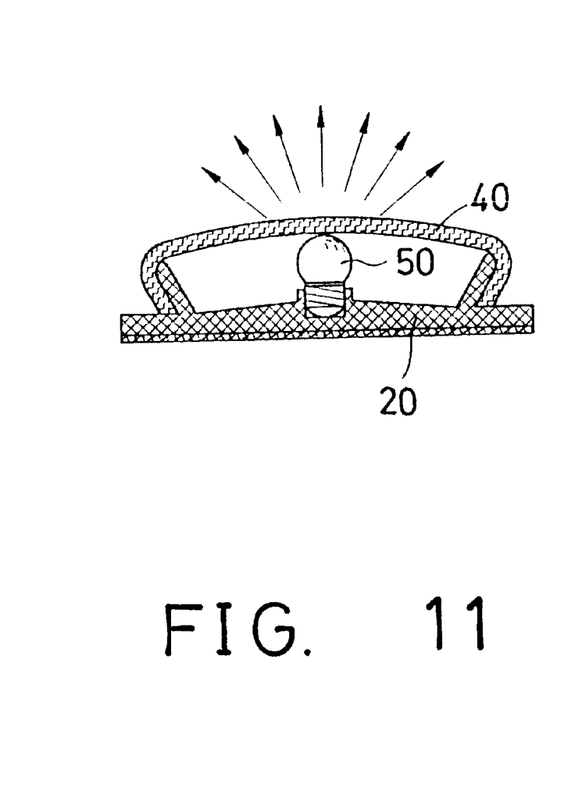
FIGS. 11 and 12 are cross sectional views similar to FIG. 6, illustrating the operation of the auxiliary light device.
Figure 12:
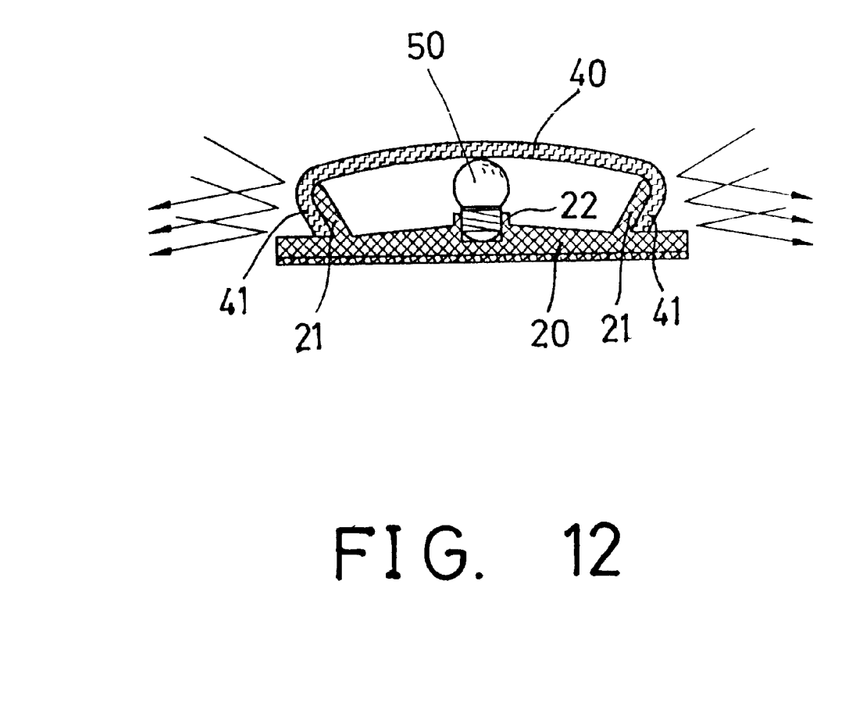

In operation, as shown in FIGS. 9 and 11, either or both of the light device 30 and the light member 50 may be energized for generating a warning light signal, particularly during the night, and for safety purposes, or for indicating the left or right turn of the vehicles. The catches 41 of the covers 40 may be solidly attached onto the bars 11, 21 of the plates 10, 20. A detachable cap may further be provided and attached onto each of the covers 40 for enclosing the covers 40 and for preventing water or the like from entering into the covers 40, as shown in FIGS. 10 and 12. The gaps formed between the plates 10, 20 or between the covers 40 may be sealed with adhesive materials or with any suitable sealing members for forming an air tight or a water tight seal. The auxiliary light device may be attached onto the vehicles, the cycles, the carts, the school bags, or may even be carried by the children or by the pedestrians for reflecting lights and/or for generating a warning light signal and for safety purposes.

Figure 1:
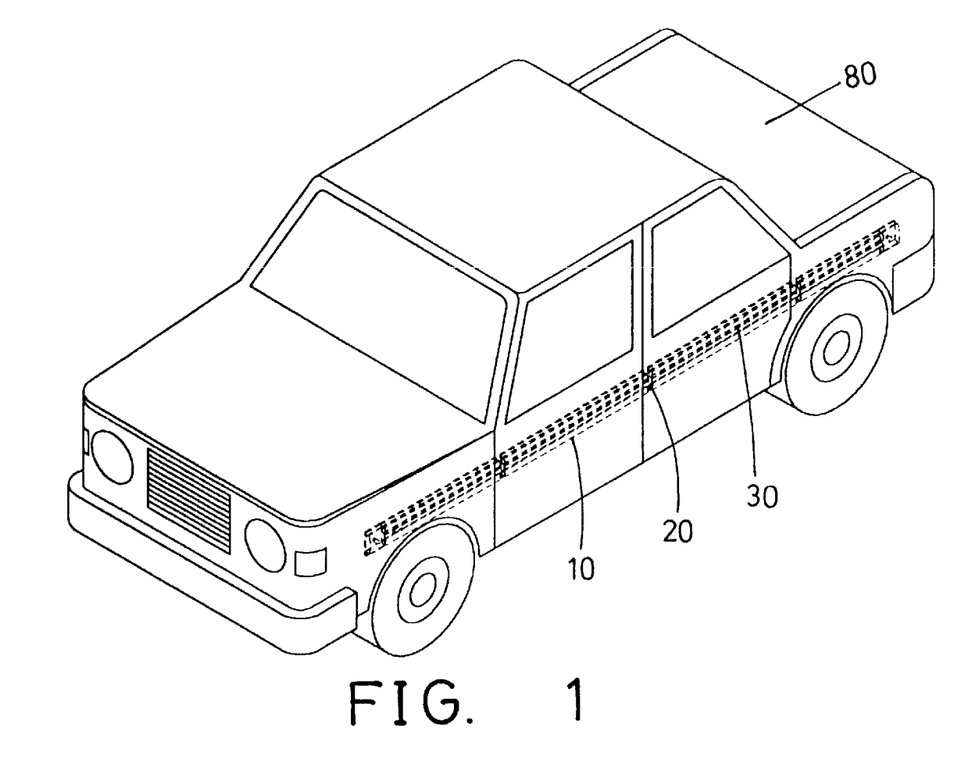
FIG. 1 is a perspective view of a vehicle employing an auxiliary light device in accordance with the present invention.
Figure 2:
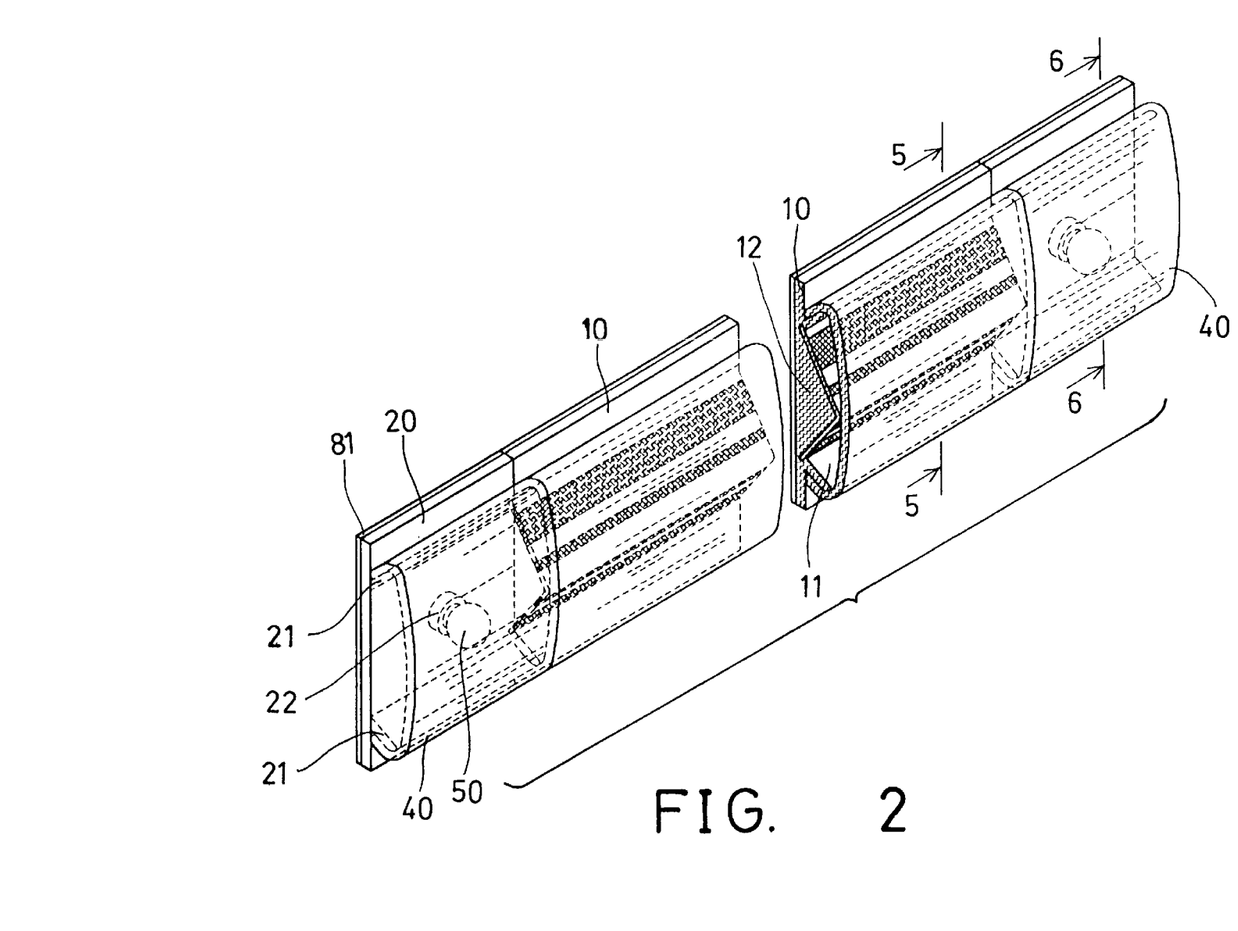
FIG. 2 is a perspective view of the auxiliary light device, in which a portion of the auxiliary light device is cut off for showing the inner structure of the auxiliary light device.
Figure 3:
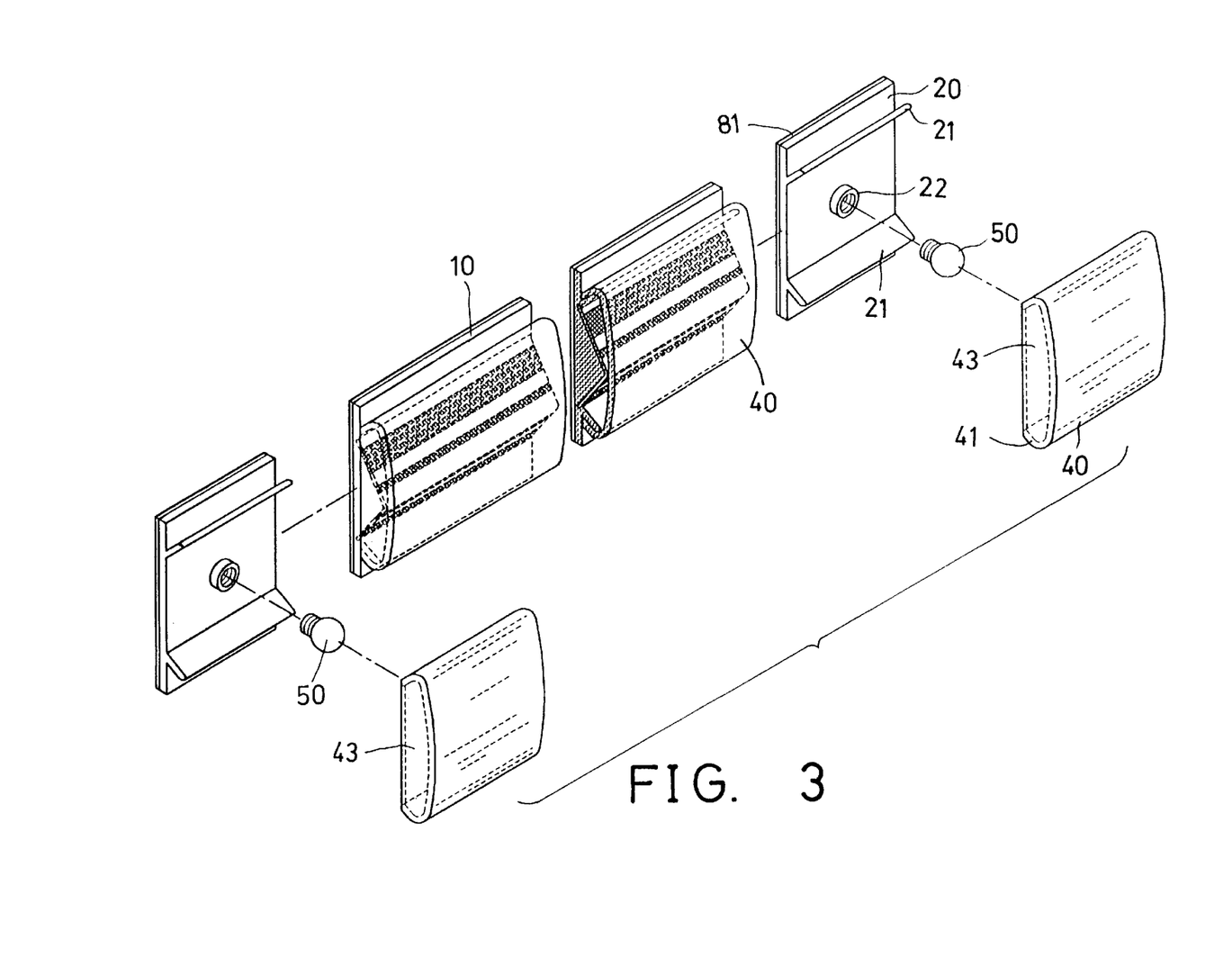
FIGS. 3 and 4 are partial exploded views of the auxiliary light device.
Figure 4:
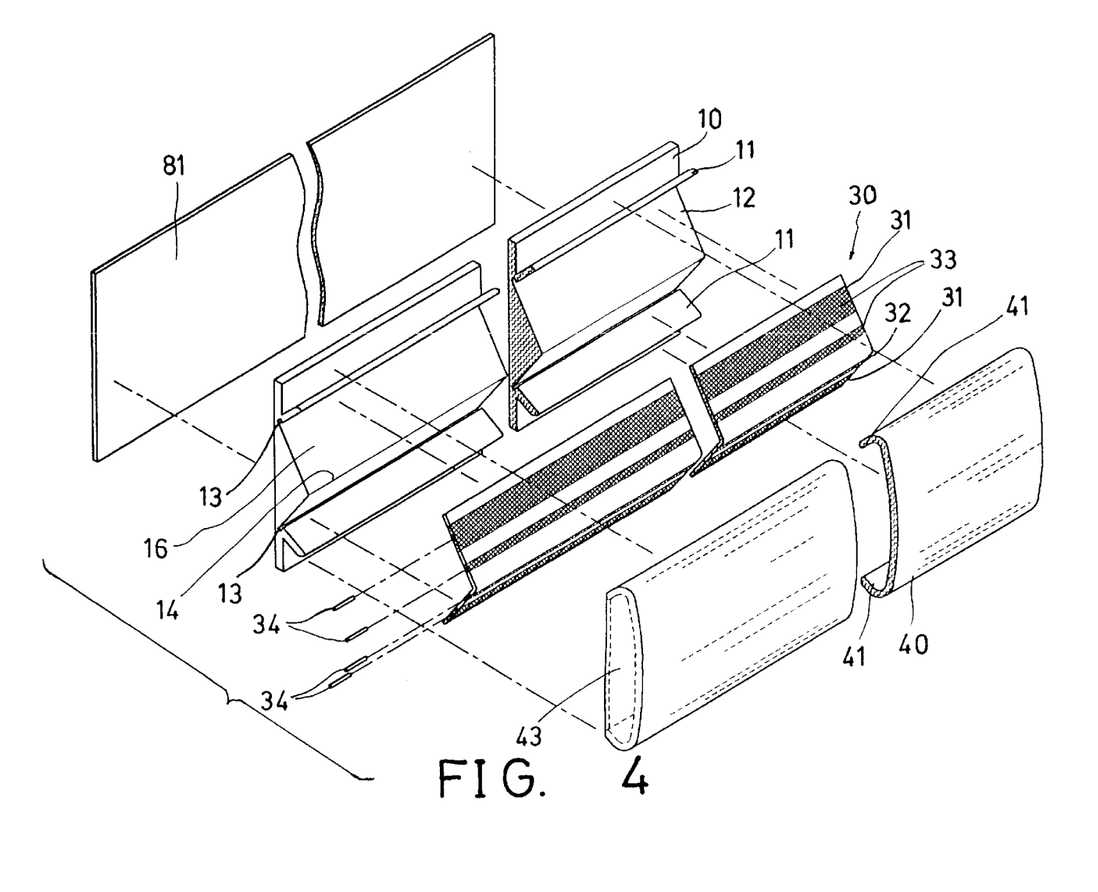
Figure 5:
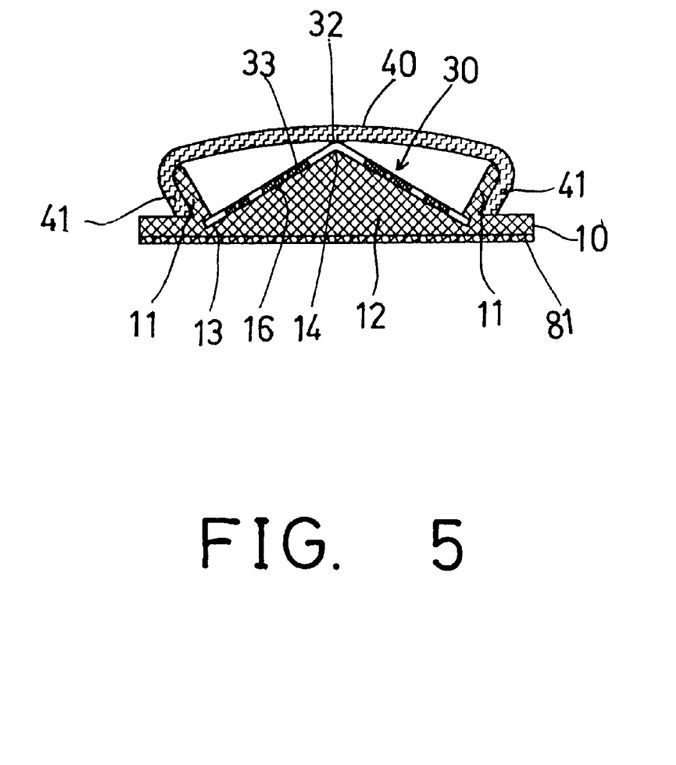
FIGS. 5 and 6 are cross sectional views taken along lines 5—5 and 6—6 of FIG. 2 respectively.
Figure 6:
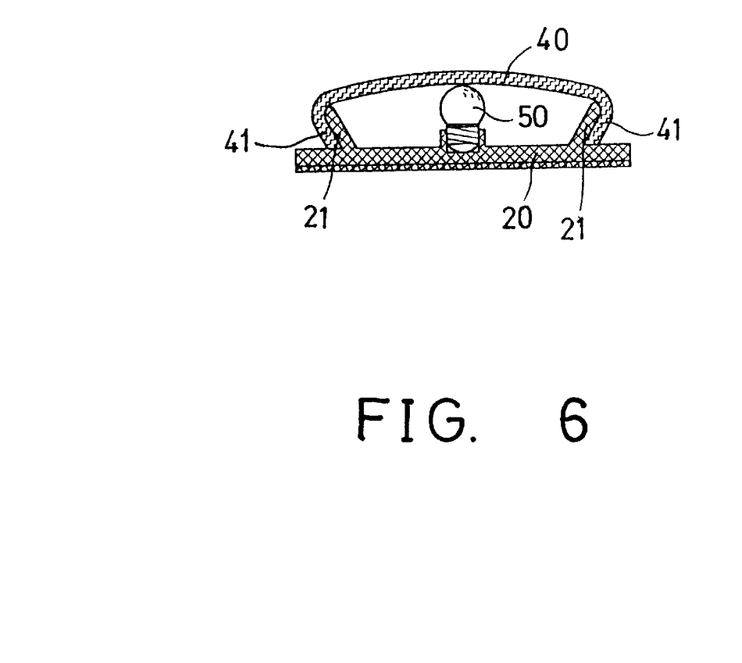
Figure 7:
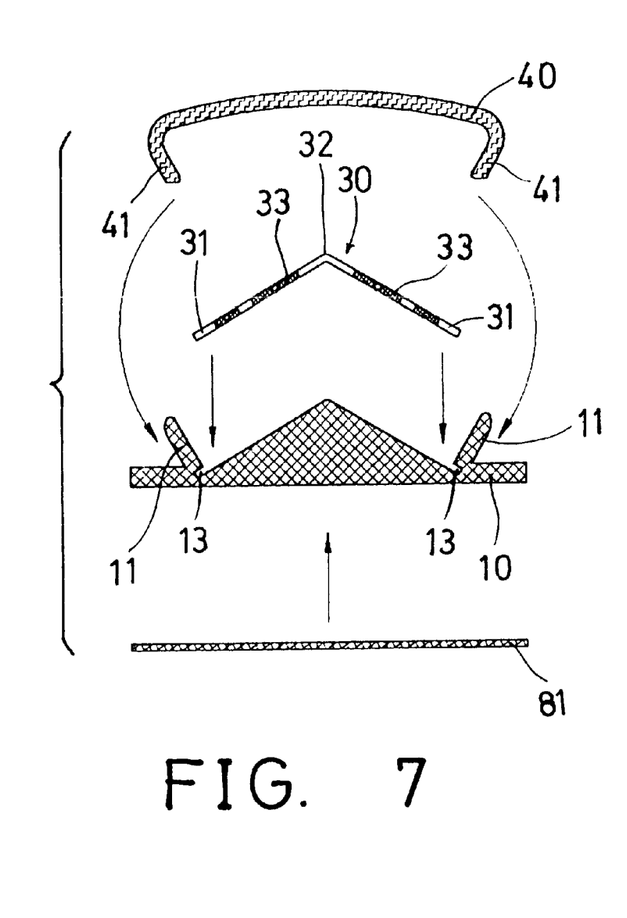
FIGS. 7 and 8 are exploded cross sectional views of FIGS. 5 and 6 respectively.
Figure 8:
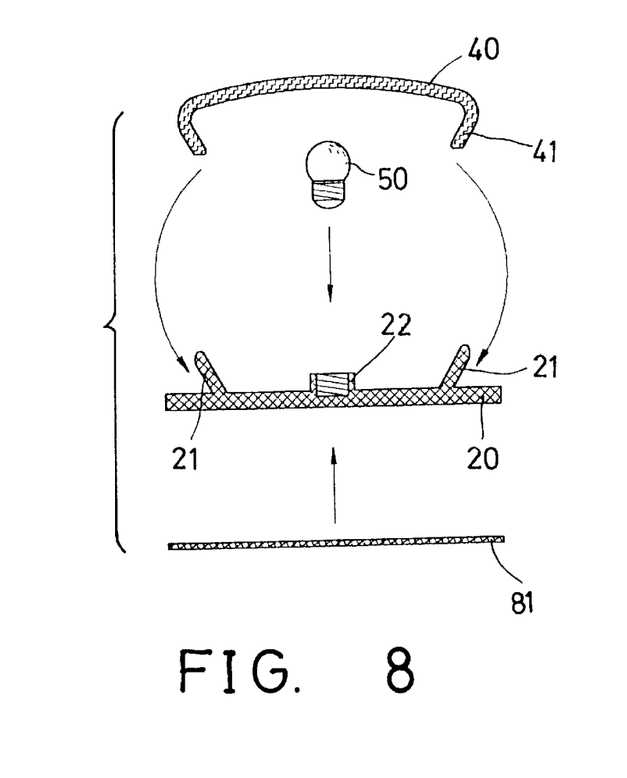

It is to be noted that the plates 10, 20 may be formed as an integral one-piece member by molding or by mold injection processes, and the covers 40 may also be formed as an integral one-piece member by molding or by mold injection processes, according to the length of the plates 10, 20 to be required or according to the object 80 to which the auxiliary light device is going to be attached thereto. However, it is preferable that the plates 10, 20 are formed or manufactured separately and may each be arranged and secured onto the object 80 with the securing devices 81 by the users. As shown in FIG. 1, the auxiliary light device may be attached to the side portions of the vehicle for reflecting the light and/or for generating a light signal for indicating the turning of the vehicles.

Accordingly, the auxiliary light device in accordance with the present invention may be used for attaching to any suitable places of the vehicles, the cycles, etc., for reflecting lights and/or for generating a warning signal to indicate the turning of the vehicles.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An auxiliary light device comprising:

a plate including a bulge extended therefrom, and including a pair of inclined surfaces formed on said bulge, and including a cusp defined between said inclined surfaces thereof and formed on said bulge, said plate including a pair of bars extended therefrom and formed beside said inclined surfaces and said bulge of said plate, and said plate including a pair of grooves formed therein and formed between said bulge and said bars of said plate respectively, a pair of panels arranged between said bars and engaged onto said inclined surfaces of said plate, said panels being coupled together at a bent portion, said bent portion of said panels being engaged onto said cusp of said plate, said panels each including a free edge engaged into said grooves of said plate respectively for securing said panels onto said plate, at least one light member provided on said panels, at least one socket provided on said plate, at least one light bulb engaged with said at least one socket, and a cover including a pair of catches extended therefrom and engaged with said bars for attaching said cover onto said plate, and for covering said panels and said at least one light member and said at least one socket and said at least one light bulb.

2. The auxiliary light device according to claim 1 further comprising at least one electric coupler coupled to said at least one light member for coupling said at least one light member to an electric power source.

* * * * *